United States Patent

Toyama

[11] Patent Number: 5,864,435
[45] Date of Patent: Jan. 26, 1999

[54] COMPACT WIDE-ANGLE ZOOM LENS

[75] Inventor: Nobuaki Toyama, Omiya, Japan

[73] Assignee: Fuji Photo Optical Co. Ltd., Omiya, Japan

[21] Appl. No.: 946,072

[22] Filed: Oct. 7, 1997

[30] Foreign Application Priority Data

Nov. 19, 1996 [JP] Japan ..................................... 8-324586

[51] Int. Cl.$^6$ .............................. G02B 15/14; G02B 3/02; G02B 9/04
[52] U.S. Cl. .......................... 359/692; 359/691; 359/717; 359/795
[58] Field of Search .................... 359/691, 692, 359/717, 795

[56] References Cited

U.S. PATENT DOCUMENTS

| | | | |
|---|---|---|---|
| 4,818,081 | 4/1989 | Ito | 359/692 |
| 4,936,661 | 6/1990 | Betensky et al. | 359/692 |
| 5,229,887 | 7/1993 | Hayashi et al. | 359/692 |
| 5,646,787 | 7/1997 | Kamo | 359/692 |
| 5,663,838 | 9/1997 | Hasushita et al. | 359/692 |
| 5,687,027 | 11/1997 | Itoh | 359/692 |
| 5,726,811 | 3/1998 | Kang et al. | 359/692 |
| 5,729,392 | 3/1998 | Yoon | 359/692 |
| 5,757,556 | 5/1998 | Nishimura | 359/692 |
| 5,798,873 | 8/1998 | Hoshi et al. | 359/692 |
| 5,805,352 | 9/1998 | Kawamura | 359/692 |
| 5,808,812 | 9/1998 | Kamo | 359/692 |

FOREIGN PATENT DOCUMENTS 7-234363  9/1995  Japan .

Primary Examiner—Georgia Epps
Assistant Examiner—Evelyn A. Lester
Attorney, Agent, or Firm—Ronald R. Snider

[57] ABSTRACT

In a compact wide-angle zoom lens having a two-group configuration composed of positive and negative lens groups, each lens is set to have a predetermined form and satisfy a predetermined range of conditional expression, thereby attaining a high brightness at its wide-angle end, a large angle of view, and a small lens thickness at its telephoto end. The first lens group comprises a biconcave negative first lens $L_1$; a cemented lens composed of a negative second lens $L_2$ and a biconvex positive third lens $L_3$; and a biconvex positive fourth lens $L_4$. The second lens group comprises a fifth lens $L_5$ having an aspheric surface; a sixth lens $L_6$ having a positive meniscus form with a convex surface directed onto the image side; and a seventh lens $L_7$ having a negative meniscus form with a convex surface directed onto the image side. The zoom lens further satisfies the following conditional expressions:

$$0 < (r_3+r_4)/(r_3-r_4) < 3.5,\ 0.5 < (r_{11}+r_{12})/(r_{11}-r_{12}) < 4.5,\ 0.9 < |r_5/r_4| < 2.3,$$
$$n_1 > 1.65,\ n_4 < 1.57$$

wherein $r_3$ is the radius of curvature of the object-side surface of said second lens $r_4$ is the radius of curvature of the image-side surface of said second lens $r_5$ is the radius of curvature of the image-side surface of said third lens $r_{11}$ is the radius of curvature of the object-side surface of said sixth lens $r_{12}$ is the radius of curvature of the image-side surface of said sixth lens $n_1$ is the refractive index of said first lense $n_4$ is the refractive index of said fourth lense

3 Claims, 15 Drawing Sheets

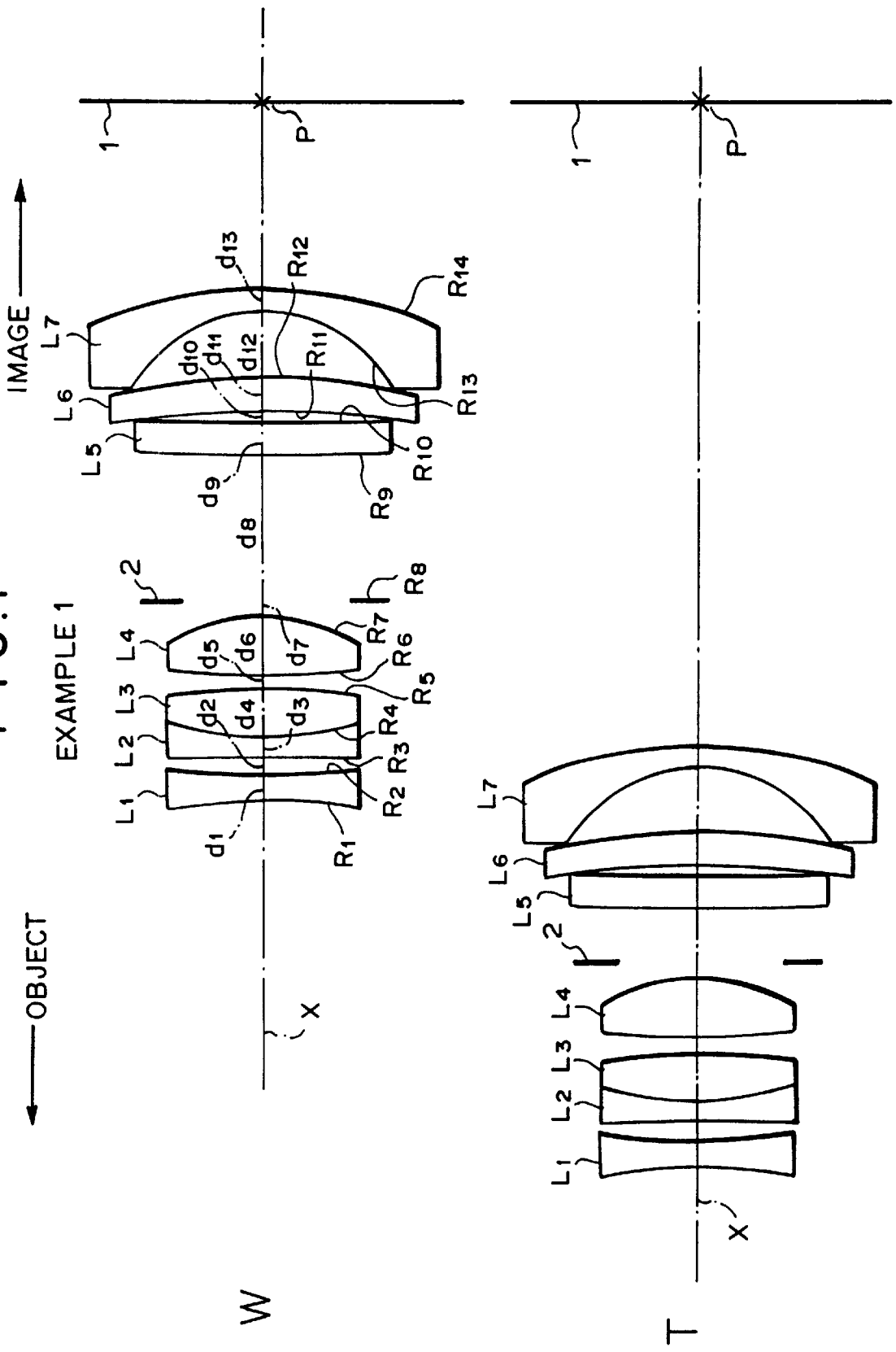
FIG. 1 EXAMPLE 1

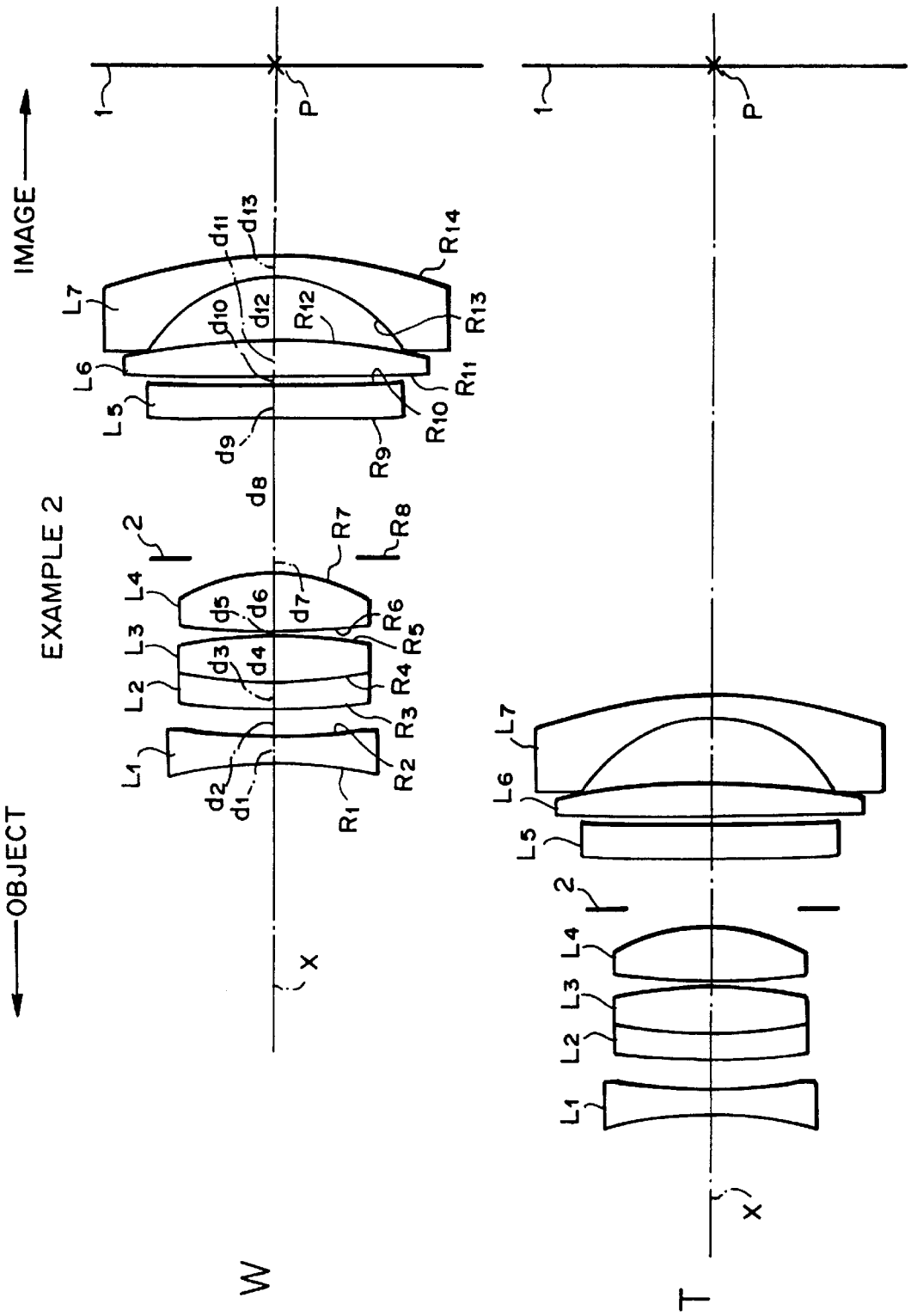

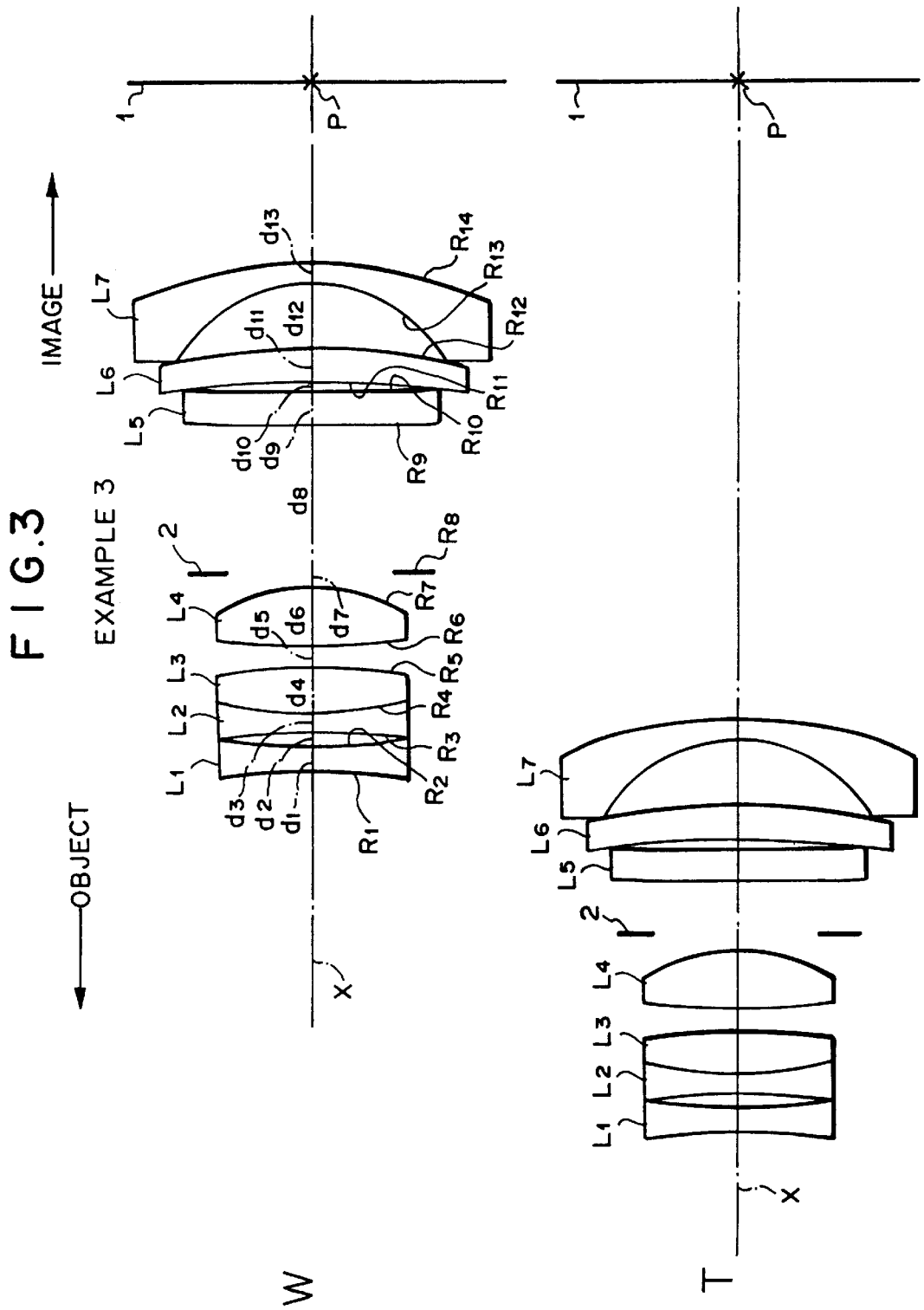

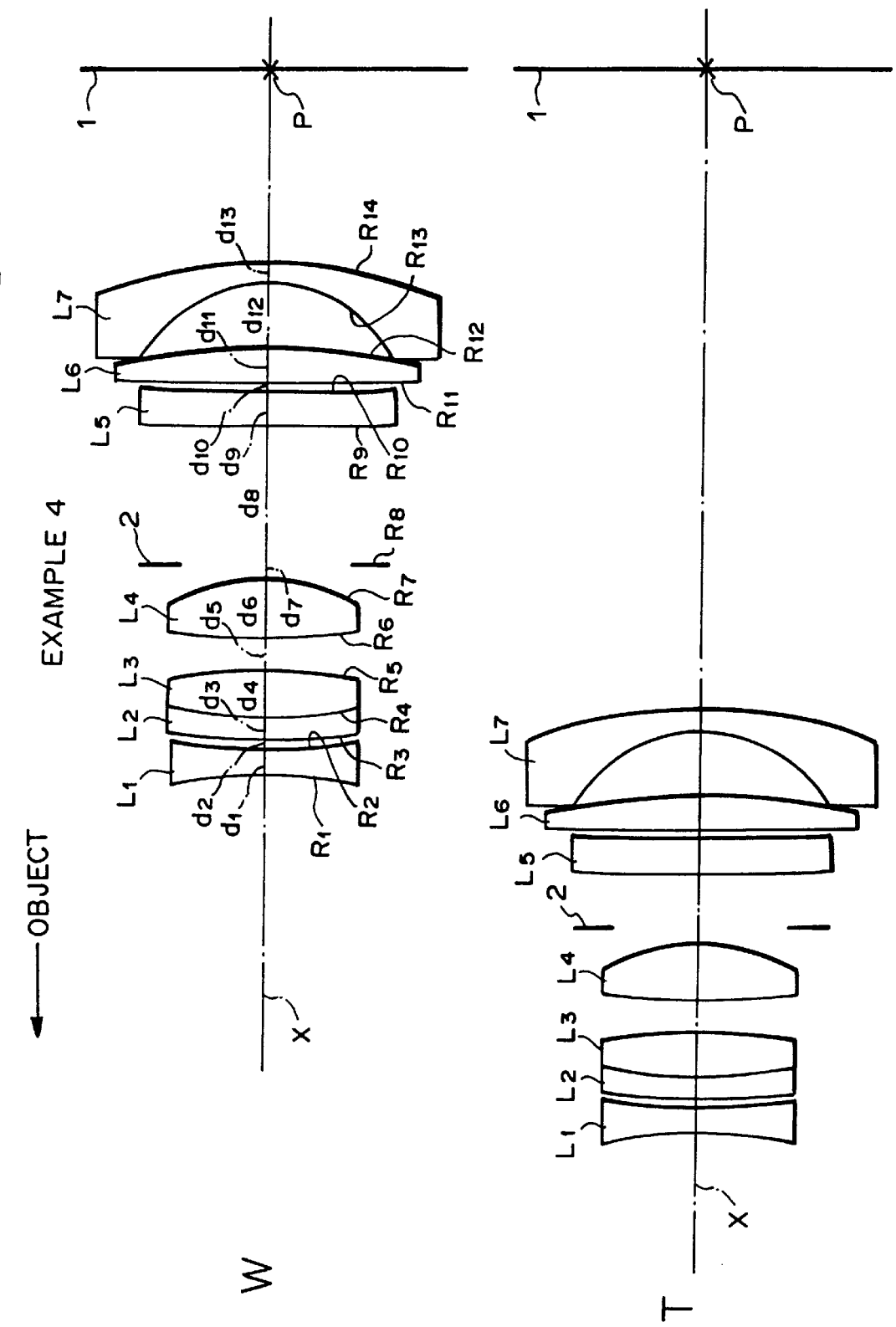

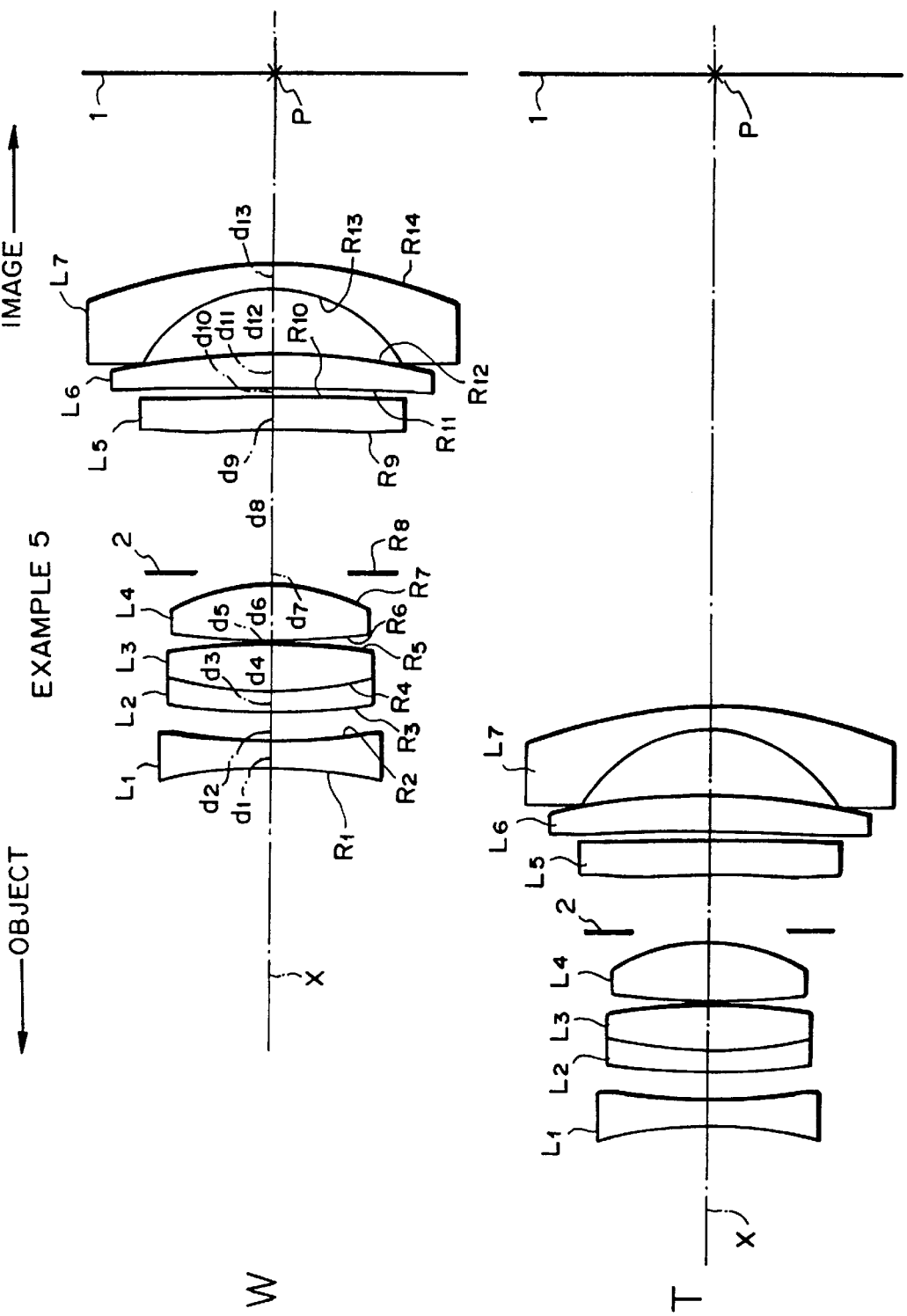

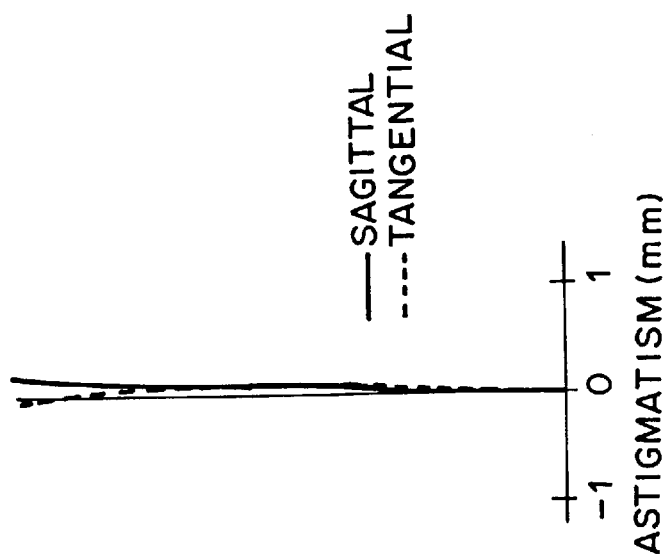
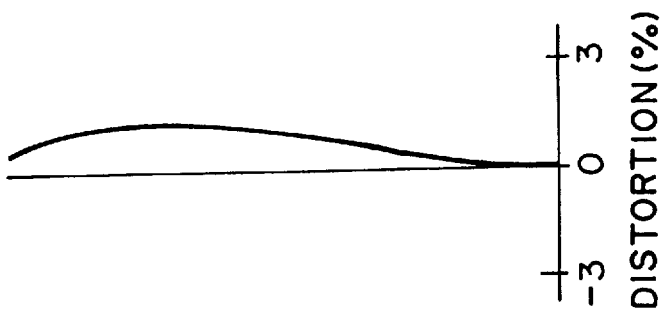

FIG.7C EXAMPLE 1 TELEPHOTO END ω=22.1°
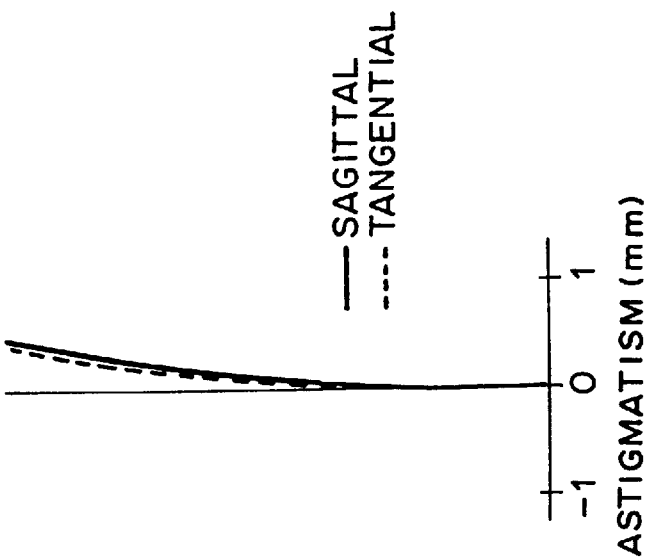
FIG.7B EXAMPLE 1 TELEPHOTO END ω=22.1°
—— SAGITTAL
---- TANGENTIAL
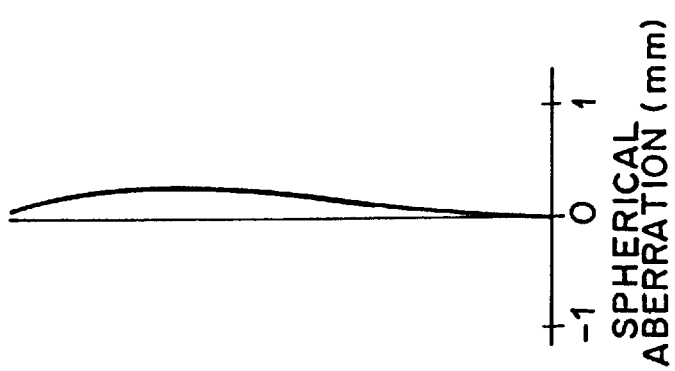
FIG.7A EXAMPLE 1 TELEPHOTO END F/7.79

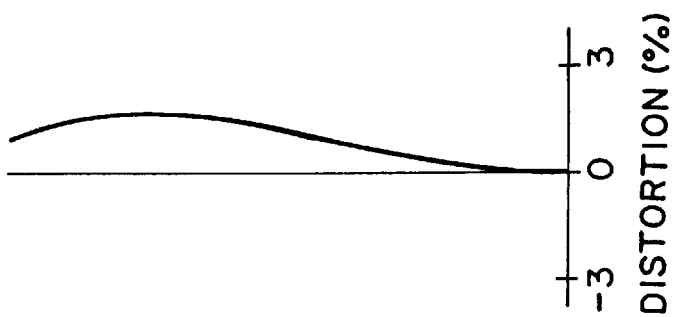
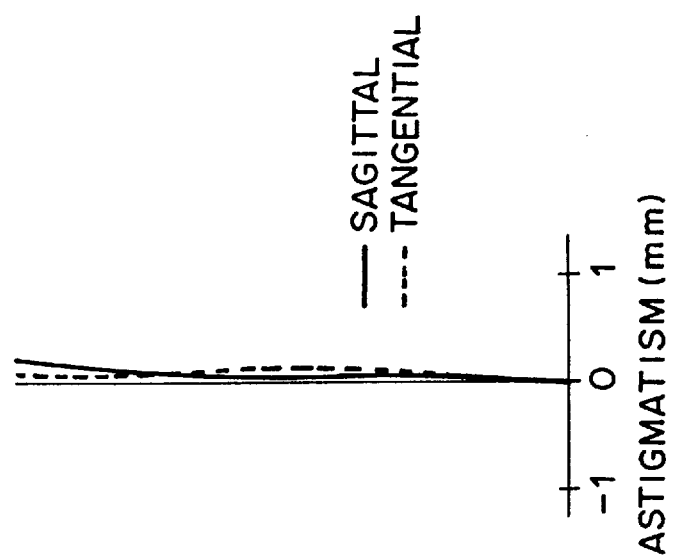

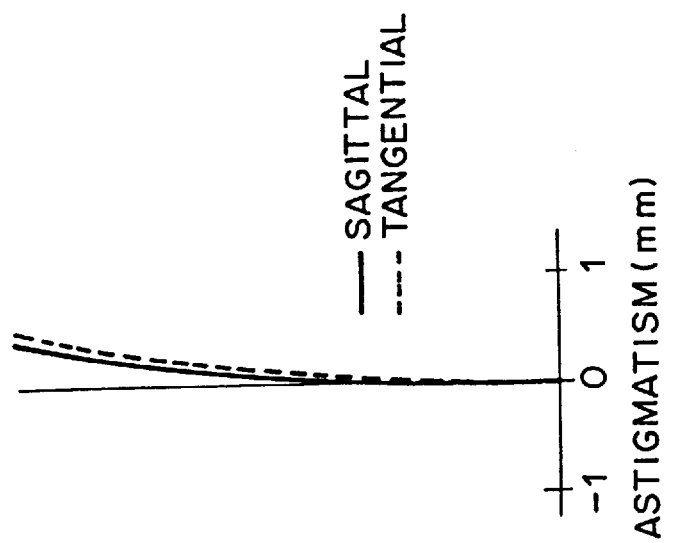

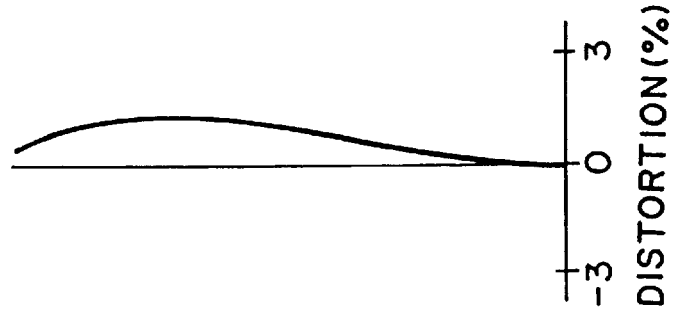
FIG.10C EXAMPLE 3 WIDE-ANGLE END ω=36.6°
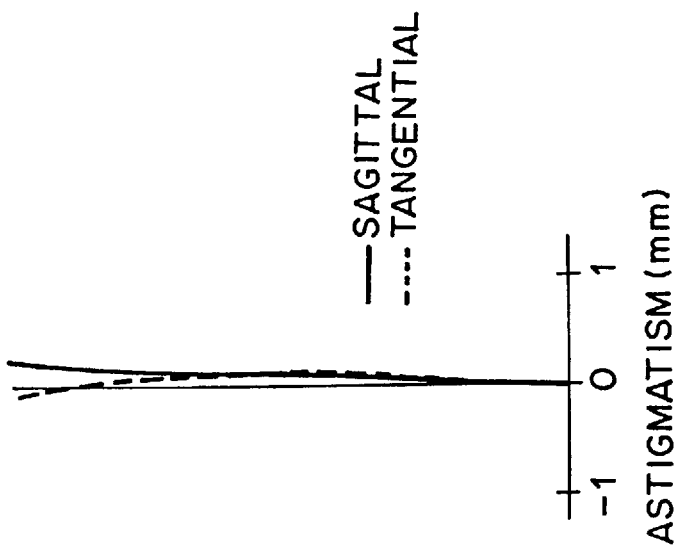
FIG.10B EXAMPLE 3 WIDE-ANGLE END ω=36.6°
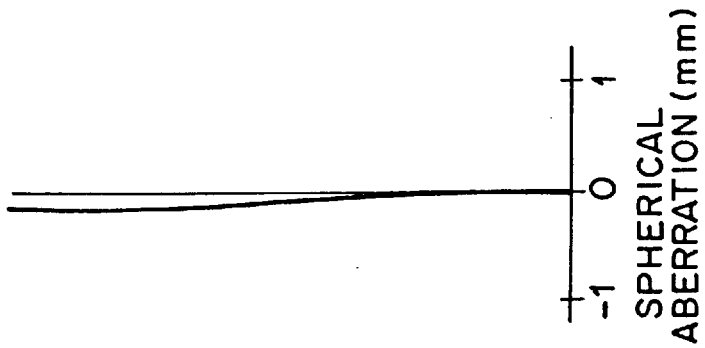
FIG.10A EXAMPLE 3 WIDE-ANGLE END F/4.63

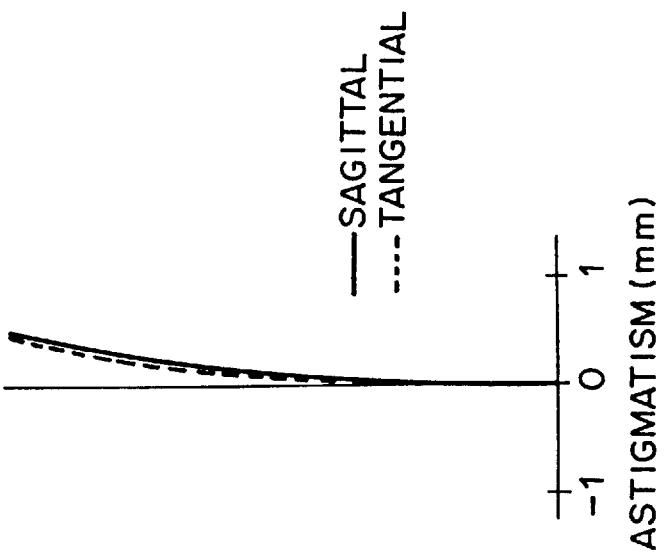

EXAMPLE 4
WIDE-ANGLE
END
F/4.63

EXAMPLE 4
WIDE-ANGLE
END
ω=36.5°

—— SAGITTAL
---- TANGENTIAL

EXAMPLE 4
WIDE-ANGLE
END
ω=36.5°

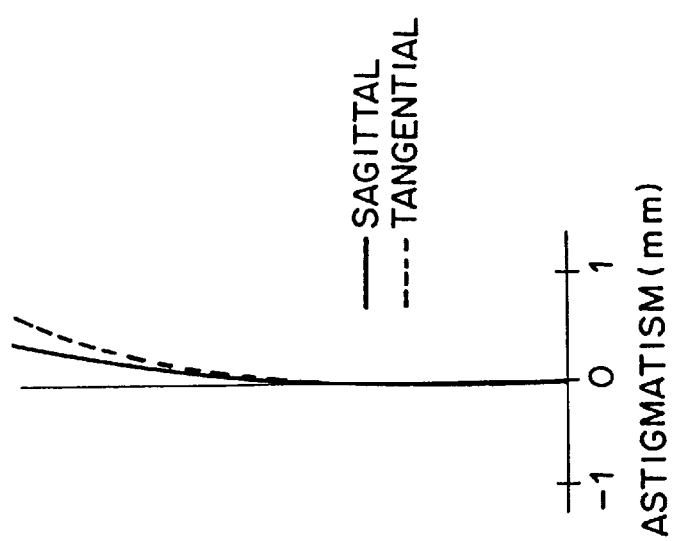

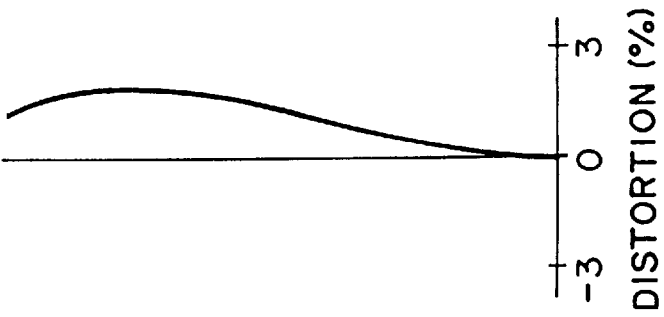
FIG.14C EXAMPLE 5 WIDE-ANGLE END ω=36.4°
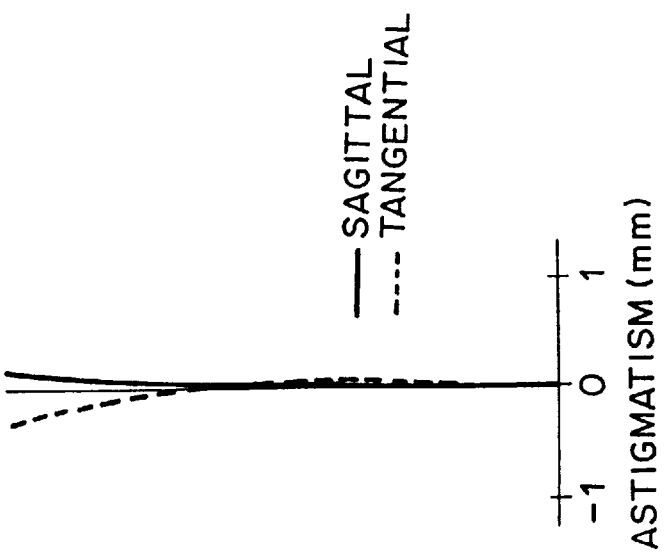
FIG.14B EXAMPLE 5 WIDE-ANGLE END ω=36.4°
FIG.14A EXAMPLE 5 WIDE-ANGLE END F/4.63

FIG.15A EXAMPLE 5 TELEPHOTO END F/7.80
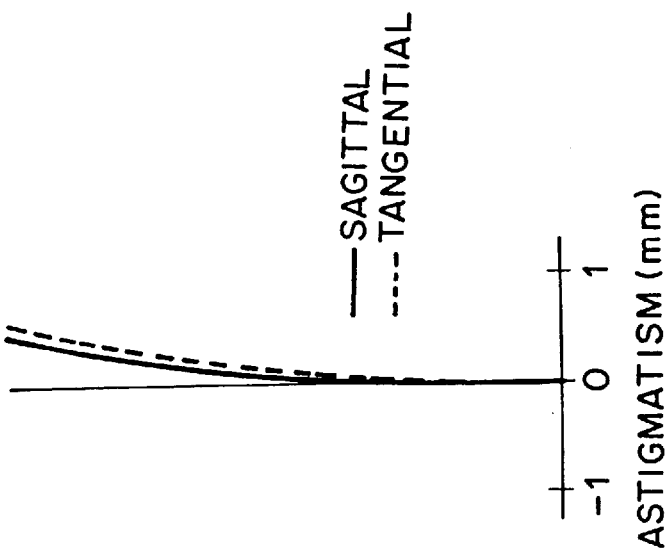
FIG.15B EXAMPLE 5 TELEPHOTO END ω=22.0°
—— SAGITTAL
---- TANGENTIAL
FIG.15C EXAMPLE 5 TELEPHOTO END ω=22.0°

COMPACT WIDE-ANGLE ZOOM LENS

RELATED APPLICATIONS

This application claims the priority of Japanese Patent Application No. 8-324586 filed on Nov. 19, 1996, which is incorporated herein by reference.

BACKGROUND OF THE INVENTION

1. Field of the Invention

The present invention relates to a compact wide-angle zoom lens for a lens shutter camera, which covers a wide angle area by two lens groups.

2. Description of the Prior Art

Recently, as a lens system used for lens shutter cameras, that loaded with a zoom lens has been becoming the mainstream. Since such a zoom lens requires its compactness in the first place, there has been put into practice a two-group zoom lens with a telephoto type of refracting power arrangement, comprising a first lens group with a positive refracting power and a second lens group with a negative refracting power.

Further, in such a telephoto type two-group zoom lens, known as the one intended for wider angle and more compactness is that disclosed in Japanese Unexamined Patent Publication No. 7-234363.

In the zoom lens disclosed in the above-mentioned publication, the F number at the wide-angle end is as dark as about 5.7, and the lens thickness (distance from the front-side lens surface of the first lens to the rear-side lens surface of the last lens on the optical axis) becomes large at the telephoto end.

SUMMARY OF THE INVENTION

In view of such circumstances, it is an object of the present invention to provide a compact wide-angle zoom lens which can yield a high brightness at its wide-angle end, a large angle of view, and a small lens thickness at its telephoto end.

The compact wide-angle zoom lens in accordance with the present invention comprises, successively from an object side, a first lens group having a positive refracting power and a second lens group having a negative refracting power, in which a distance between the lens groups is changed to attain a variable power;

wherein the first lens group comprises, successively from the object side, a biconcave negative first lens, a negative second lens, a biconvex positive third lens, and a biconvex positive fourth lens, the second and third lenses being cemented together;

wherein the second lens group comprises, successively from the object side, a fifth lens having at least one aspheric surface, a sixth lens having a positive meniscus form with a convex surface directed onto an image side, and a seventh lens having a negative meniscus form with a convex surface directed onto the image side; and wherein the zoom lens satisfies the following conditional expressions:

$$0 < (r_3 + r_4)/(r_3 - r_4) < 3.5 \quad (1)$$

$$0.5 < (r_{11} + r_{12})/(r_{11} - r_{12}) < 4.5 \quad (2)$$

$$0.9 \leq |r_5/r_4| < 2.3 \quad (3)$$

$$n_1 > 1.65 \quad (4)$$

$$n_4 < 1.57 \quad (5)$$

wherein $r_3$ is the radius of curvature of the object-side surface of said second lens $r_4$ is the radius of curvature of the image-side surface of said second lens $r_5$ is the radius of curvature of the image-side surface of said third lens $r_{11}$ is the radius of curvature of the object-side surface of said sixth lens $r_{12}$ is the radius of curvature of the image-side surface of said sixth lens $n_1$ is the refractive index of said first lense $n_4$ is the refractive index of said fourth lense In order to cause each kind of aberration such as coma, image surface curvature, or the like to be favorable, it is preferred that the first lens have at least one aspheric surface.

In order to reduce the cost for making the fifth lens having an aspheric surface, it is preferred that the fifth lens be made of a plastic material.

BRIEF DESCRIPTION OF THE DRAWINGS

FIG 1. is a schematic view showing a basic lens configuration in accordance with Example 1 of the present invention;

FIG. 2 is a schematic view showing a basic lens configuration in accordance with Example 2 of the present invention;

FIG. 3 is a schematic view showing a basic lens configuration in accordance with Example 3 of the present invention;

FIG. 4 is a schematic view showing a basic lens configuration in accordance with Example 4 of the present invention;

FIG. 5 is a schematic view showing a basic lens configuration in accordance with Example 5 of the present invention;

FIG. 6A, 6B, and 6C are aberration charts of the lens in accordance with Example 1 at its wide-angle end;

FIG. 7A, 7B, and 7C are aberration charts of the lens in accordance with Example 1 at its telephoto end;

FIG. 8A, 8B, and 8C are aberration charts of the lens in accordance with Example 2 at its wide-angle end;

FIG. 9A, 9B, and 9C are aberration charts of the lens in accordance with Example 2 at its telephoto end;

FIG. 10A, 10B, and 10C are aberration charts of the lens in accordance with Example 3 at its wide-angle end;

FIG. 11A, 11B, and 11C are aberration charts of the lens in accordance with Example 3 at its telephoto end;

FIG. 13A, 13B, and 13C are aberration charts of the lens in accordance with Example 4 at its telephoto end;

FIG. 14A, 14B, and 14C are aberration charts of the lens in accordance with Example 5 at its wide-angle end; and FIG. 15A, 15B, and 15C are aberration charts of the lens in accordance with Example 5 at its telephoto end.

DESCRIPTION OF THE PREFERRED EMBODIMENTS

Figure 12A:
FIG. 12A, 12B, and 12C are aberration charts of the lens in accordance with Example 4 at its wide-angle end.

In the following, specific examples of the present invention will be explained with reference to the drawings.

EXAMPLE 1

The compact wide-angle zoom lens in accordance with Example 1 shown in FIG. 1 (with its positions at wide-angle and telephoto ends being respectively indicated by W and T, as with the following FIGS. 2 to 5) comprises, successively from the object side, a first lens group $L_1$ to $L_4$ having a positive refracting power as a whole and a second lens group $L_5$ to $L_7$ having a negative refracting power as a whole. Upon zooming, the first lens group $L_1$ to $L_4$ and the second lens group $L_5$ to $L_7$ move along an optical axis X while changing the distance therebetween, thus changing the focal length f of the whole system and efficiently converging a luminous flux onto an imaging point P on an imaging surface 1. Here, a stop 2 is disposed downstream the first lens group $L_1$ to $L_4$.

The first lens group $L_1$ to $L_4$ comprises a biconcave negative first lens $L_1$; a cemented lens composed of a negative second lens $L_2$ and a biconvex positive third lens $L_3$; and a biconvex positive fourth lens $L_4$. The second lens group $L_5$ to $L_7$ comprises a fifth lens $L_5$ having an aspheric surface; a sixth lens $L_6$ having a positive meniscus form with a convex surface directed onto the image side; and a seventh lens $L_7$ having a negative meniscus form with a convex surface directed onto the image side.

Further, the following conditional expressions are satisfied:

$$0 < (r_3 + r_4)/(r_3 - r_4) < 3.5 \quad (1)$$

$$0.5 < (r_{11} + r_{12})/(r_{11} - r_{12}) < 4.5 \quad (2)$$

$$0.9 < |r_5/r_4| < 2.3 \quad (3)$$

$$n_1 > 1.65 \quad (4)$$

$$n_4 < 1.57 \quad (5)$$

wherein $r_3$ is the radius of curvature of the object-side surface of said second lens $r_4$ is the radius of curvature of the image-side surface of said second lens $r_5$ is the radius of curvature of the image-side surface of said third lens $r_{11}$ is the radius of curvature of the object-side surface of said sixth lens $r_{12}$ is the radius of curvature of the image-side surface of said sixth lens $n_1$ is the refractive index of said first lense $n_4$ is the refractive index of said fourth lense Also, each surface of the first lens $L_1$ and fifth lens $L_5$ is shaped into an aspheric surface of a predetermined form. Further, the fifth lens $L_5$ is made of a plastic material.

In the following, the technical significance of each of the above-mentioned expressions will be explained.

Above the upper limit of conditional expression (1), chromatic aberration in magnification increases so much that it is hard to correct. Below the lower limit thereof, on the other hand, axial chromatic aberration increases so much that it is hard to correct.

Above the upper limit of conditional expression (2), coma increases so much that it is hard to correct, while its form becomes unfavorable in terms of productivity. Below the lower limit thereof, coma also increases so much that it is hard to correct.

Outside conditional expression (3), coma increases so much that it is hard to correct.

Below the lower limit of conditional expression (4), coma and image surface curvature increase so that various kinds of aberration are hard to correct with a favorable balance.

Above the upper limit of conditional expression (5), image surface curvature increases so much that it is hard to correct.

Here, when each surface of the fifth lens is shaped into an aspheric surface, aberration such as distortion, image surface curvature, or the like can be made favorable.

In this example, as the configuration of each lens and the above-mentioned conditional expressions are satisfied as mentioned above, various kinds of aberration in any object distance ranging from long distance to near distance can be favorably corrected, thus yielding high optical performances throughout the object distance.

Table 1 (follows) shows the radius of curvature R (mm) of each lens surface, the center thickness of each lens and air gap between neighboring lenses (collectively referred to as "axial spacing" hereinafter) d (mm), and the refractive index n and Abbe number ν of each lens at d-line in the zoom lens in accordance with this example.

In Table 1, the reference numbers successively increase from the object side.

Each of the surfaces marked with "*" on the right side of the surface number in Table 1 is shaped into an aspheric surface as mentioned above, which means that it is in an aspheric form represented by the following expression (A):

$$Z = CY^2/[1 + (1 - kC^2Y^2)^{1/2}] + AY^4 + BY^6 + CY^8 + DY^{10} \quad (A)$$

wherein

Z is a length (mm) of a perpendicular on a tangent plane (plane perpendicular to an optical axis) of an apex of an aspheric surface from a point on the aspheric surface at a height Y from the optical axis;

C (1/R) is a paraxial curvature of the aspheric surface;

Y is a height (mm) from the optical axis;

k is an eccentricity; and

A, B, C, and D are aspheric surface coefficients of the fourth, sixth, eighth, and tenth orders, respectively.

Table 2 (follows) shows values of the constants A, B, C, D, and k of the aspheric surfaces indicated by the above-mentioned expression (A).

Further, the focal length f, F No, and angle of view 2ω of the whole lens system in this example are set as shown in Table 3 (follows).

EXAMPLE 2

The compact wide-angle zoom lens in accordance with Example 2 is configured so as to be substantially similar to that of Example 1, as shown in FIG. 2, and satisfy the above-mentioned conditional expressions (1) to (5).

Table 4 (follows) shows the radius of curvature R (mm) of each lens surface, the axial spacing d (mm), and the refractive index n and Abbe number ν of each lens at d-line in the zoom lens in accordance with this example.

In Table 4, the reference numbers successively increase from the object side.

Each of the surfaces marked with "*" on the right side of the surface number in Table 4 is shaped into an aspheric surface, which means that it is in an aspheric form represented by the above-mentioned expression (A).

Table 5 (follows) shows values of the constants A, B, C, D, and k of the aspheric surfaces indicated by the above-mentioned expression (A).

Further, the focal length f, F No, and angle of view 2ω of the whole lens system in this example are set as shown in Table 6 (follows).

EXAMPLE 3

The compact wide-angle zoom lens in accordance with Example 3 is configured so as to be substantially similar to that of Example 1, as shown in FIG. 3, and satisfy the above-mentioned conditional expressions (1) to (5).

Table 7 (follows) shows the radius of curvature R (mm) of each lens surface, the axial spacing d (mm), and the refractive index n and Abbe number ν of each lens at d-line in the zoom lens in accordance with this example.

In Table 7, the reference numbers successively increase from the object side.

Each of the surfaces marked with "*" on the right side of the surface number in Table 7 is shaped into an aspheric surface, which means that it is in an aspheric form represented by the above-mentioned expression (A).

Table 8 (follows) shows values of the constants A, B, C, D, and k of the aspheric surfaces indicated by the above-mentioned expression (A).

Further, the focal length f, F No, and angle of view 2ω of the whole lens system in this example are set as shown in Table 9 (follows).

EXAMPLE 4

The compact wide-angle zoom lens in accordance with Example 4 is configured so as to be substantially similar to that of Example 1, as shown in FIG. 4, and satisfy the above-mentioned conditional expressions (1) to (5).

Table 10 (follows) shows the radius of curvature R (mm) of each lens surface, the axial spacing d (mm), and the refractive index n and Abbe number ν of each lens at d-line in the zoom lens in accordance with this example.

In Table 10, the reference numbers successively increase from the object side.

Each of the surfaces marked with "*" on the right side of the surface number in Table 10 is shaped into an aspheric surface, which means that it is in an aspheric form represented by the above-mentioned expression (A).

Table 11 (follows) shows values of the constants A, B, C, D, and k of the aspheric surfaces indicated by the above-mentioned expression (A).

Further, the focal length f, F No, and angle of view 2ω of the whole lens system in this example are set as shown in Table 12 (follows).

EXAMPLE 5

The compact wide-angle zoom lens in accordance with Example 5 is configured so as to be substantially similar to that of Example 1, as shown in FIG. 5, and satisfy the above-mentioned conditional expressions (1) to (5).

Table 13 (follows) shows the radius of curvature R (mm) of each lens surface, the axial spacing d (mm), and the refractive index n and Abbe number ν of each lens at d-line in the zoom lens in accordance with this example.

In Table 13, the reference numbers successively increase from the object side.

Each of the surfaces marked with "*" on the right side of the surface number in Table 13 is shaped into an aspheric surface, which means that it is in an aspheric form represented by the above-mentioned expression (A).

Table 14 (follows) shows values of the constants A, B, C, D, and k of the aspheric surfaces indicated by the above-mentioned expression (A).

Further, the focal length f, F No, and angle of view 2ω of the whole lens system in this example are set as shown in Table 15 (follows).

Figure 12B:
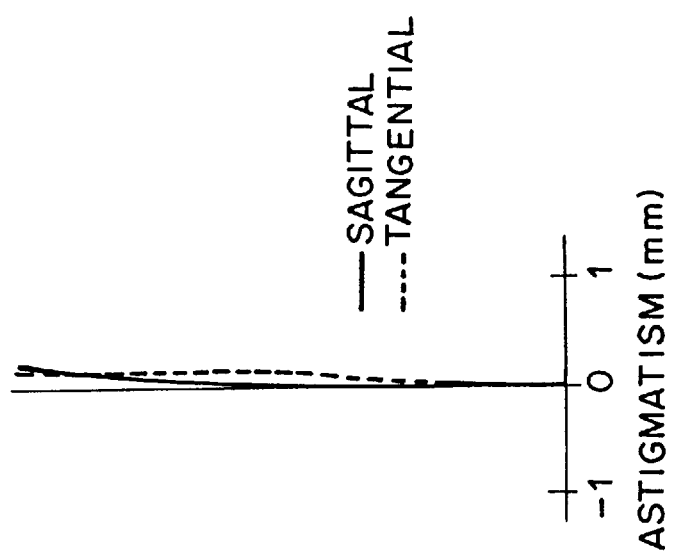
Figure 12C:
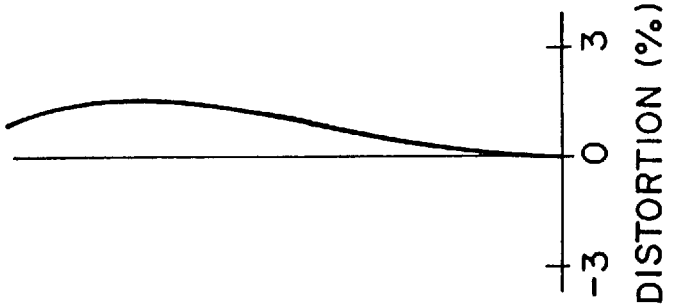

FIGS. 6, 8, 10, 12, and 14 are aberration charts showing various kinds of aberration (spherical aberration, astigmatism, and distortion) of the zoom lenses in accordance with the above-mentioned respective examples at their wide-angle end; whereas FIGS. 7, 9, 11, 13, and 15 are aberration charts showing various kinds of aberration (spherical aberration, astigmatism, and distortion) of the zoom lenses in accordance with the above-mentioned respective examples at their telephoto end. Here, each aberration chart concerning astigmatism shows aberrations with respect to sagittal (S) and tangential (T) image surfaces As can be seen from these aberration charts, each kind of aberration can be favorably corrected by the zoom lens in accordance with each of the above-mentioned examples.

The zoom lens of the present invention should not be restricted to the above-mentioned examples. For example, the forms of lenses constituting each lens group as well as the number and forms of the aspheric surfaces can be appropriately selected.

In the compact wide-angle zoom lens of the present invention, a lens system which is bright at its wide-angle end can be obtained in a simple and compact two-group configuration. Also, its angle of view can be made wide, and the lens thickness can be reduced at its telephoto end. Further, various kinds of aberration in any object distance ranging from long distance to near distance can be corrected favorably.

TABLE 1

|   | R | d | n | ν |
|---|---|---|---|---|
| 1 * | −22.739 | 1.42 | 1.80247 | 33.74 |
| 2 * | 499.990 | 0.93 | | |
| 3 | 384615.385 | 1.10 | 1.57427 | 52.38 |
| 4 | 16.563 | 2.54 | 1.59401 | 55.96 |
| 5 | −34.258 | 0.75 | | |
| 6 | 50.000 | 3.08 | 1.48749 | 70.40 |
| 7 | −9.256 | 0.80 | | |
| 8 | Stop | 7.55 to 2.85 | | |
| 9 * | −59.739 | 1.80 | 1.49020 | 57.49 |
| 10 * | −88.981 | 0.40 | | |
| 11 | −58.092 | 1.85 | 1.77517 | 26.24 |
| 12 | −34.854 | 3.42 | | |
| 13 | −7.741 | 1.10 | 1.80165 | 44.04 |
| 14 | −22.328 | | | | f = 28.98 to 53.84  F No = 4.63 to 7.78  Angle of view 2ω = 44.2° to 73.2°

TABLE 2

| Surface | A | B | C | D | k |
|---|---|---|---|---|---|
| 1 | 1.4893935E − 04 | 1.8858483E − 06 | −5.4474482E − 08 | −9.6623714E − 10 | 3.1695353E − 01 |
| 2 | 4.4879218E − 04 | 5.1685176E − 06 | 7.6598626E − 08 | −1.5885633E − 09 | 1.0010702E + 00 |
| 9 | 1.9929142E − 04 | 3.1515057E − 06 | 7.1395412E − 09 | −1.5814644E − 11 | 8.9294278E − 01 |
| 10 | 5.7075468E − 05 | 9.1008351E − 07 | 2.4013161E − 08 | −1.4017132E − 10 | 9.9993930E − 01 |

TABLE 3

Conditional expression (1) 1.00
(2) 4.00
(3) 2.07
(4) 1.80
(5) 1.49

TABLE 4

| | R | d | n | v |
|---|---|---|---|---|
| 1 * | −22.239 | 1.42 | 1.76618 | 37.19 |
| 2 * | 198.271 | 1.45 | | |
| 3 | 51.503 | 1.36 | 1.78988 | 39.34 |
| 4 | 25.752 | 2.47 | 1.48500 | 65.44 |
| 5 | −25.754 | 0.15 | | |
| 6 | 50.000 | 3.03 | 1.48749 | 70.40 |
| 7 | −9.551 | 0.80 | | |
| 8 | Stop | 7.15 to 2.79 | | |
| 9 * | −60.253 | 1.80 | 1.49020 | 57.49 |
| 10 * | −1978.114 | 0.40 | | |
| 11 | −5753.475 | 1.85 | 1.67652 | 31.68 |
| 12 | −38.349 | 3.30 | | |
| 13 | −7.528 | 1.15 | 1.80035 | 46.41 |
| 14 | −26.038 | | | | f = 29.02 to 53.91  F No = 4.63 to 7.78  Angle of view 2ω = 44.0° to 72.8°

TABLE 5

| Surface | A | B | C | D | k |
|---|---|---|---|---|---|
| 1 | 5.1717118E − 05 | 2.2918629E − 06 | −5.3465110E − 08 | −6.0353960E − 10 | 6.4767161E − 01 |
| 2 | 3.5904770E − 04 | 4.9073562E − 06 | 6.2935548E − 08 | −1.1480423E − 09 | 1.0007774E + 00 |
| 9 | 1.8966194E − 04 | 2.4385422E − 06 | −1.8532359E − 08 | 1.0384508E − 09 | 8.9312212E − 01 |
| 10 | 1.8368083E − 05 | 6.6685513E − 07 | −2.2503411E − 08 | 6.5933904E − 10 | 9.9685707E − 01 |

TABLE 6

Conditional expression (1) 3.00
(2) 1.01
(3) 1.00
(4) 1.77
(5) 1.49

TABLE 7

| | R | d | n | v |
|---|---|---|---|---|
| 1 * | −32.331 | 1.42 | 1.80500 | 28.85 |
| 2 * | 500.007 | 0.68 | | |
| 3 | −30.515 | 1.10 | 1.48500 | 62.11 |
| 4 | 20.313 | 2.46 | 1.55616 | 57.95 |
| 5 | −29.264 | 1.15 | | |
| 6 | 50.000 | 3.07 | 1.48749 | 70.40 |
| 7 | −9.230 | 0.80 | | |
| 8 | Stop | 8.10 to 2.94 | | |
| 9 * | −54.583 | 1.80 | 1.49020 | 57.49 |
| 10 * | −67.319 | 0.40 | | |
| 11 | −58.164 | 1.85 | 1.71564 | 29.22 |
| 12 | −34.898 | 3.45 | | |
| 13 | −8.031 | 1.10 | 1.80500 | 44.88 |
| 14 | −22.526 | | | | f = 29.02 to 53.91  F No = 4.63 to 7.78  Angle of view 2ω = 44.2° to 73.2°

TABLE 8

| Surface | A | B | C | D | k |
|---|---|---|---|---|---|
| 1 | 1.7611837E − 04 | 1.6135279E − 06 | −3.9297525E − 08 | −1.4670743E − 09 | 2.7462447E − 01 |
| 2 | 4.7943595E − 04 | 5.5145925E − 06 | 8.5799181E − 08 | −1.4859383E − 09 | 1.0010682E + 00 |
| 9 | 1.9884960E − 04 | 3.3184114E − 06 | −1.6104725E − 08 | 2.5033932E − 10 | 8.9285145E − 01 |
| 10 | 7.1462984E − 05 | 9.6859141E − 07 | 1.7435756E − 08 | −5.5237571E − 11 | 9.9883285E − 01 |

TABLE 9

Conditional expression (1) 0.20
(2) 4.02
(3) 1.44
(4) 1.81
(5) 1.49

TABLE 10

|   | R | d | n | v |
|---|---|---|---|---|
| 1 * | −22.793 | 1.42 | 1.80500 | 32.77 |
| 2 * | 204.891 | 0.42 | | |
| 3 | 57.284 | 1.10 | 1.80029 | 47.97 |
| 4 | 24.752 | 2.39 | 1.48500 | 64.38 |
| 5 | −28.250 | 1.71 | | |
| 6 | 50.000 | 2.96 | 1.55000 | 63.08 |
| 7 | −10.014 | 0.80 | | |
| 8 | Stop | 7.17 to 2.94 | | |
| 9 * | −61.731 | 1.80 | 1.49020 | 57.49 |
| 10 * | −973.410 | 0.40 | | |
| 11 | −7836.991 | 1.85 | 1.61018 | 36.98 |
| 12 | −37.179 | 3.27 | | |
| 13 | −7.584 | 1.10 | 1.80500 | 43.94 |
| 14 | −25.266 | 0.00 | | | f = 29.02 to 53.91 F No = 4.63 to 7.78 Angle of view 2ω = 44.0° to 73.0°

TABLE 11

| Surface | A | B | C | D | k |
|---|---|---|---|---|---|
| 1 | 7.7553659E − 05 | 2.2604618E −06 | −3.9610842E − 08 | −9.4979943E − 10 | 5.7667953E − 01 |
| 2 | 3.5121499E − 04 | 5.0522535E − 06 | 4.3382877E − 08 | −1.5649000E − 09 | 1.0007357E + 00 |
| 9 | 1.8984713E − 04 | 2.5882822E − 06 | −6.2083803E − 08 | 5.8822874E − 10 | 8.9305591E − 01 |
| 10 | 2.5735711E − 05 | 7.4955040E − 07 | −8.0105852E − 09 | 3.2724826E − 10 | 9.9683721E − 01 |

TABLE 12

Conditional expression (1) 2.52
(2) 1.01
(3) 1.14
(4) 1.81
(5) 1.55

TABLE 13

|   | R | d | n | v |
|---|---|---|---|---|
| 1 * | −20.760 | 1.42 | 1.73077 | 40.50 |
| 2 * | 479.505 | 1.50 | | |
| 3 | 44.189 | 1.10 | 1.66998 | 39.28 |
| 4 | 19.740 | 2.51 | 1.48749 | 70.40 |
| 5 | −31.313 | 0.13 | | |
| 6 | 49.995 | 3.02 | 1.48749 | 70.40 |
| 7 | −9.455 | 0.60 | | |
| 8 | Stop | 7.29 to 2.94 | | |
| 9 * | −47.778 | 1.80 | 1.4902 | 57.49 |
| 10 * | −122.278 | 0.40 | | |
| 11 | −119.690 | 1.85 | 1.71736 | 29.50 |
| 12 | −35.548 | 3.33 | | |
| 13 | −7.468 | 1.31 | 1.80235 | 46.70 |
| 14 | −23.811 | 0.00 | | | f = 29.04 to 53.94 F No = 4.63 to 7.80 Angle of view 2ω = 44.0° to 72.8°

TABLE 14

| Surface | A | B | C | D | k |
|---|---|---|---|---|---|
| 1 | 1.1624710E − 04 | 2.1260080E − 06 | −5.9254950E − 08 | −8.3258276E −10 | 4.2600602E − 01 |
| 2 | 4.3120367E − 04 | 5.0791643E − 06 | 8.0363946E − 08 | −1.9229663E − 09 | 1.0010120E + 00 |
| 9 | 2.0231963E − 04 | 2.9339466E − 06 | −2.2676329E − 08 | 7.3768857E − 10 | 8.9073820E − 01 |
| 10 | 3.4988155E − 05 | 5.3467995E − 07 | −5.4252425E − 09 | 1.8383392E − 10 | 1.0006530E + 00 |

TABLE 15

| Conditional expression |
| --- |
| (1) 2.61 |
| (2) 1.84 |
| (3) 1.59 |
| (4) 1.73 |
| (5) 1.49 |

What is claimed is:

1. A compact wide-angle zoom lens comprising, successively from an object side, a first lens group having a positive refracting power and a second lens group having a negative refracting power, in which a distance between said lens groups is changed to attain a variable power;

wherein said first lens group comprises, successively from the object side, a biconcave negative first lens, a negative second lens, a biconvex positive third lens, and a biconvex positive fourth lens, said second and third lenses being cemented together;

wherein said second lens group comprises, successively from the object side, a fifth lens having at least one aspheric surface, a sixth lens having a positive meniscus form with a convex surface directed onto an image side, and a seventh lens having a negative meniscus form with a convex surface directed onto the image side; and wherein said zoom lens satisfies the following conditional expressions:

$$0<(r_3+r_4)/(r_3-r_4)<3.5 \qquad (1)$$

$$0.5<(r_{11}+r_{12})/(r_{11}-r_{12})<4.5 \qquad (2)$$

$$0.9<|r_5/r_4|<2.3 \qquad (3)$$

$$n_1>1.65 \qquad (4)$$

$$n_4<1.57 \qquad (5)$$

wherein $r_3$ is the radius of curvature of the object-side surface of said second lens $r_4$ is the radius of curvature of the image-side surface of said second lens $r_5$ is the radius of curvature of the image-side surface of said third lens $r_{11}$ is the radius of curvature of the object-side surface of said sixth lens $r_{12}$ is the radius of curvature of the image-side surface of said sixth lens $n_1$ is the refractive index of said first lens $n_4$ is the refractive index of said fourth lens.

2. A compact wide-angle zoom lens according to claim 1, wherein said first lens has at least one aspheric surface.

3. A compact wide-angle zoom lens according to claim 1, wherein said fifth lens is made of a plastic material.

* * * * *